United States Patent
Enevoldsen

(10) Patent No.: US 9,945,357 B2
(45) Date of Patent: Apr. 17, 2018

(54) FLEXIBLE FLAP ARRANGEMENT FOR A WIND TURBINE ROTOR BLADE

(71) Applicant: Peder Bay Enevoldsen, Vejle (DK)

(72) Inventor: Peder Bay Enevoldsen, Vejle (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 1369 days.

(21) Appl. No.: 13/763,786

(22) Filed: Feb. 11, 2013

(65) Prior Publication Data
US 2013/0266441 A1 Oct. 10, 2013

(30) Foreign Application Priority Data
Apr. 4, 2012 (EP) .................................. 12163154

(51) Int. Cl.
F03D 7/02 (2006.01)
F03D 1/06 (2006.01)

(52) U.S. Cl.
CPC ........... F03D 7/0232 (2013.01); F03D 1/065 (2013.01); F03D 7/0204 (2013.01); *F05B 2240/122* (2013.01); *F05B 2240/311* (2013.01); *F05B 2240/96* (2013.01); *Y02E 10/721* (2013.01); *Y02E 10/723* (2013.01)

(58) Field of Classification Search
CPC .... F03D 7/0232; F03D 7/0236; F03D 1/0608; F05B 2240/311
See application file for complete search history.

(56) References Cited

U.S. PATENT DOCUMENTS

| | | | |
|---|---|---|---|
| 7,413,408 B1* | 8/2008 | Tafoya | B64C 21/10 416/228 |
| 2009/0028705 A1* | 1/2009 | Meldgaard | F03D 1/0675 416/23 |
| 2010/0008787 A1* | 1/2010 | Godsk | F03D 1/0641 416/223 R |
| 2011/0116927 A1 | 5/2011 | Chang | |
| 2011/0142635 A1 | 6/2011 | Fritz | |
| 2011/0142665 A1* | 6/2011 | Huck | F03D 1/0633 416/228 |

FOREIGN PATENT DOCUMENTS

| | | |
|---|---|---|
| EP | 1314885 B1 | 8/2007 |
| EP | 1623111 B1 | 9/2008 |
| EP | 2034178 A2 | 3/2009 |
| WO | WO 2004088130 A1 | 10/2004 |
| WO | WO 2012019655 A1 | 2/2012 |

* cited by examiner

*Primary Examiner* — Justin Seabe
*Assistant Examiner* — Juan G Flores

(57) ABSTRACT

A flap arrangement for a wind turbine rotor blade, which includes a leading edge, a trailing edge and a chord line between the leading edge and the trailing edge, is described. The flap arrangement includes a support portion and a flap portion which is passively moveable with respect to an angle between a surface normal of a surface of the flap portion and the chord line. The support portion and the flap portion are positioned relatively to each other such that the support portion provides a limit to the movement of the flap portion. Also described are a wind turbine rotor blade including the flap arrangement and a method of enhancing the aerodynamic performance of a blade.

20 Claims, 8 Drawing Sheets

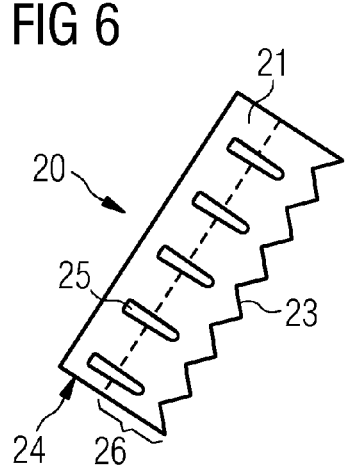
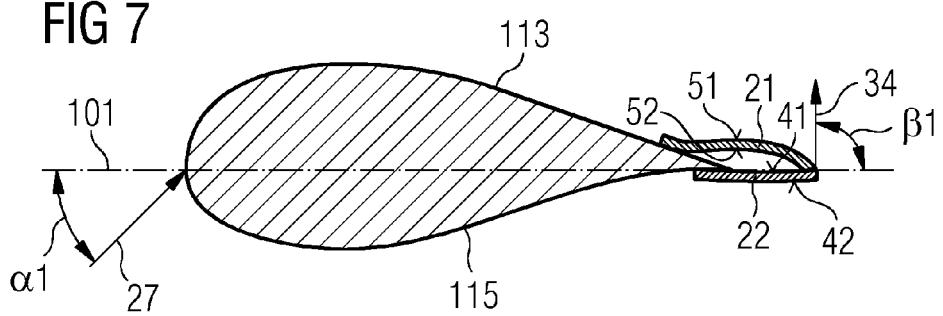
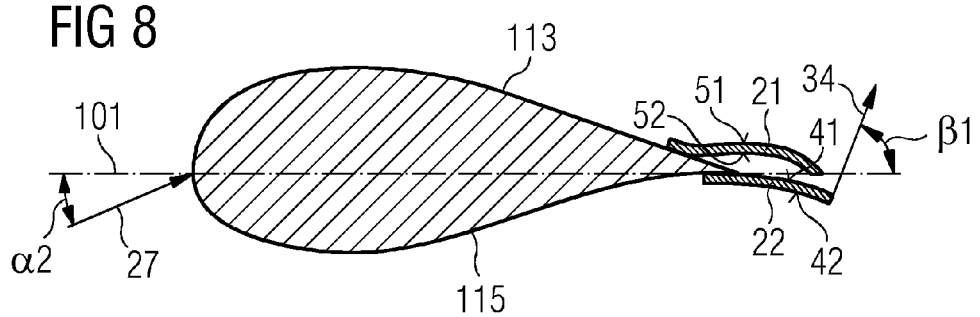

FIG 10
a)
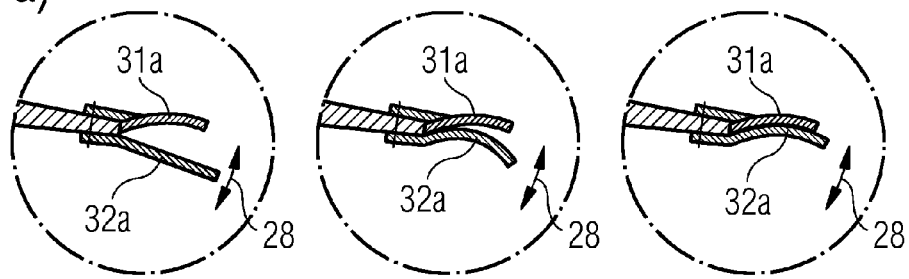
b)
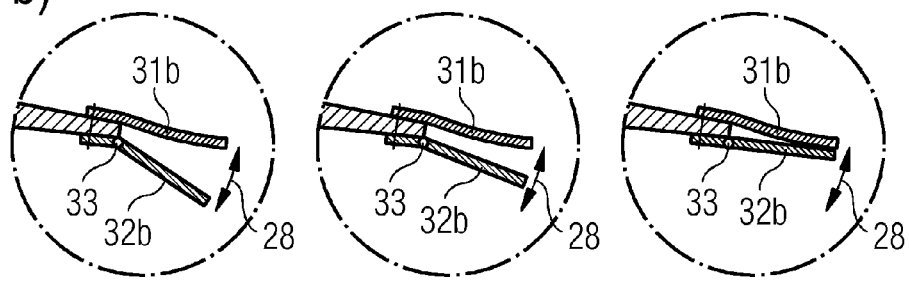
c)
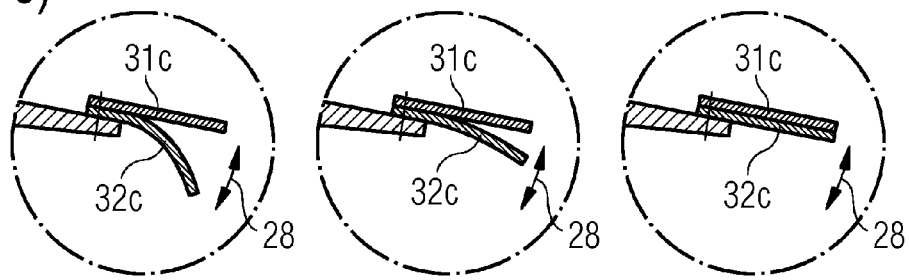
d)
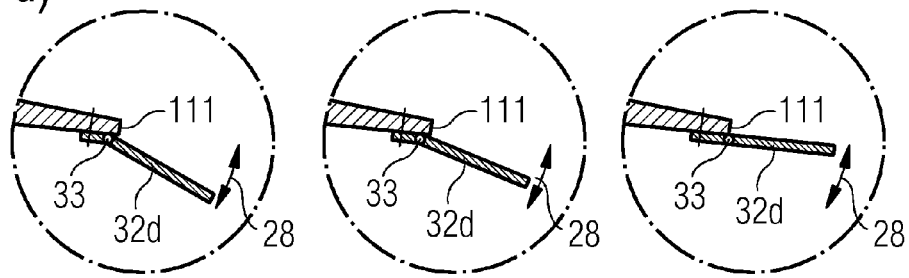

FLEXIBLE FLAP ARRANGEMENT FOR A WIND TURBINE ROTOR BLADE

CROSS REFERENCE TO RELATED APPLICATIONS

This application claims priority of European Patent Office application No. 12163154.3 EP filed Apr. 4, 2012. All of the applications are incorporated by reference herein in their entirety.

FIELD OF THE INVENTION

The present disclosure relates to a flap arrangement for a wind turbine rotor blade, to a wind turbine rotor blade and to a method for enhancing the aerodynamic performance of a wind turbine rotor blade, for example at low wind speeds.

BACKGROUND ART

Wind turbine blades are a means of converting power from wind into mechanical power to propel a generator of a wind turbine. Wind turbine blade design is mainly conducted under consideration of aerodynamic and mechanical considerations, i.e. the airfoil shape or profile is designed as a compromise between aerodynamic optimization and mechanical characteristics, for example strength, for various wind conditions. An optimal blade of a wind turbine exhibits a low cut in wind speed, good and efficient aerodynamic performance for various wind speeds, which means for low to high wind speed, minimal loads on blade and wind turbine structure, i.e. under turbulent and high wind speed conditions, and low acoustic noise.

It is for instance important that the blade can resist high forces and stresses close to the hub. Blades are therefore thick and wide in the region of a root section close to the hub. At the root, the blade is usually narrow and tubular to fit onto the hub and to provide sufficient strength. The blade profile becomes thinner and thinner as to obtain acceptable aerodynamic properties. The lift force will increase as the speed increases towards a tip of the blade, caused by a larger diameter at the same rotational frequency toward the tip. Decreasing the chord width towards the tip will contribute to counteract this effect. The blade tapers from a point somewhere near the root towards the tip. Furthermore the blade is twisted along its axis to account for a change in direction of the airflow to the wind resulting from rotation. The speed of a blade section is increasing the further it is located towards a tip of the blade.

Nevertheless, conventional blades of wind turbines have a static airfoil and thus exhibit limited possibilities to adjust for wind conditions. The only possible means of adjustment and optimization of the aerodynamic properties for a wind speed and turbulence is the adjustment of a pitch angle for the whole blade. From an aerodynamic point of view an optimal blade of a wind turbine would not only comprise a variable pitch angle for each section of the blade but also comprise of an adjustable airfoil to account for different wind and turbulence conditions.

It is commonly known to enhance and optimize the performance of wind turbine blades with devices added onto the wind turbine blade. Such devices are among others active or passive components such as flaps, vortex generators or stall strips. The actuation of flaps can for instance be conducted with electricity, hydraulic or piezoelectric means. The bending of a blade is considered to stay in a relation to blade loading and wind conditions. A passive solution is known, where a shape and/or angle of a flap relative to a blades chord line changes depending on the bending of a wind turbine blade.

Another difficulty with wind turbine blades is the occurrence of acoustic noise when in operation. The tip speed of a blade in operation is for instance 80 m/s. One means to reduce the noise is the attachment of a serrated plate in the region of the trailing edge projecting over the trailing edge. The EP 1314885 discloses valuable information on wind turbine blades technology and performance.

Generally, it is desirable to improve the aerodynamic performance and efficiency of wind turbine blades, i.e. in low wind speed conditions. Moreover, the mechanical loading of the blade may be to be minimized. A secondary factor is the reduction of acoustic noise of the wind turbines blades when in operation.

Further relevant state of the art is disclosed in EP 1623111 B1, US 2011/0116927 A1, WO 2004/088130 A3 and EP 2034178 A2. The EP 1314885 discloses an apparatus improving the efficiency of a wind turbine with a panel connected to the trailing edge of the wind turbine blade. EP 2034178 A2 discloses a fairing plate to avoid an air gap when the flap is deflected, but which has no mechanical function.

DESCRIPTION OF THE INVENTION

It is an objective to provide an improved flap arrangement, an improved wind turbine rotor blade and an improved wind turbine. Furthermore, it is an objective to provide a method for enhancing the aerodynamic performance of a wind turbine rotor blade.

The flap arrangement can be used for a wind turbine rotor blade which comprises a leading edge, a trailing edge and a chord line between the leading edge and the trailing edge. The flap arrangement comprises a support portion and a flap portion. The flap portion is passively moveable with respect to an angle between a surface normal of a surface of the flap portion and the chord line. The support portion and the flap portion are positioned relatively to each other such that the support structure provides a limit to the movement of the flap portion. Especially the movement of the flap portion towards the suction side of the blade is limited. The support portion may be stiff.

The chord line of a particular wind turbine rotor blade section is defined as the line between the leading edge and the trailing edge. The chord line includes an angle of 90° with the span line. The span line is defined as the line between the tip of the blade and the centre point of a base area of the blade root.

The support portion is connected or connectable to a wind turbine rotor blade in a non-moveable way and such that it protrudes over the trailing edge of the blade.

Generally, the support portion can be an arrest structure or support element and the flap portion can be a flap structure or flap element. The term passively moveable means that the movement takes place without any directional and intended influence or activation of a person or a machine. For example, the passive movement can be caused by the wind alone or the particular flow conditions in the vicinity of the flap portion. The passive movement of the flap portion is predominantly caused by a pressure difference between suction side and pressure side of the blade.

The support structure may comprise a pressure side surface and a suction side surface. The suction side surface may form or prolong a suction side of a wind turbine rotor blade. The flap portion may comprise a suction side surface and a pressure side surface. The pressure side surface of the flap portion may prolong a pressure side of a wind turbine rotor blade. The suction side surface of the flap portion and the pressure side surface of the support portion may face towards each other. For example, the suction side surface of the flap portion and the pressure side surface of the support portion can be located opposite to each other.

The idea behind using a support structure or support portion and a flap structure or flap portion is to provide increased lift to the blade at low wind speed while unwanted negative effects on the blade, for example extensive loading and low performance at higher wind speeds, are avoided. The flexible or moveable flap portion in combination with the support portion or arrest structure provides a passive and reliable solution to achieve a desired advantageous blade performance. The extended airfoil takes effect at low wind speeds when the angle of attack of the blade is high. The angle of attack is the angle between the chord line and the direction of airflow. The extended airfoil results in increased lift at these low wind speeds. Thus, a power curve is moved to the left (see FIG. 13) at low wind speeds and a lower cut in wind speed is achieved.

If the blades leading edge is tilted or pitched into the wind at higher wind speed, then the angle of attack is decreased or relatively low. As a result the flap portion is no longer completely in contact with the support portion. The effective airfoil is reduced. This reduction leads to lower mechanical loading of the blade opposed to a static flap or airfoil. Furthermore, loads from gusts and wind are reduced.

The support portion and/or the flap portion may be connectable to a wind turbine rotor blade at the trailing edge of the blade or at a portion of the blade close to the trailing edge. Furthermore, the blade may comprise a tip, a root and a span length extending from the tip to the blade root. The support portion and the flap portion may be connectable to a wind turbine rotor blade at a position between the tip of the blade and one half, or in another embodiment one third, of the span length of the blade measured from the tip. This means, that the flap arrangement may be located at the outer portion of the blade, for instance at the last half or third of the blades length towards the tip region.

The flap portion may comprise a flexible or hinged flap connection for connecting the flap portion to a wind turbine rotor blade. Moreover, the flap portion may comprise a flexible sheet, for example a thin flexible sheet forming a flap. Furthermore, the flap portion and/or the support portion may comprise a serrated trailing edge or a zigzag-shaped trailing edge. This provides a noise reduction.

Generally, the flap portion and the support portion can be made as one piece or as several pieces. The flap portion and the support portion can, for example, be a one or multiple piece retrofit set attachable to the blade of a wind turbine blade, for instance with an adhesive.

The support portion can comprise at least one vortex generator or other means for enhancing the performance by improving the aerodynamic shape. Moreover, the support portion can have a bend shape to provide an advantageous airfoil shape. For example, the support portion can comprise a curvature in a sectional view along the chord line.

By means of the combination of the support portion, which provides a limit to the flap portion, and the flap portion which is passively moveable with respect to the support portion, under particular air inflow conditions an additional aerodynamic effect is provided. For example, the flap portion can act as an additional or extended airfoil, which at low wind speeds increases the lift and which at high wind speeds reduces loads.

The wind turbine rotor blade comprises a flap arrangement as previously described. The wind turbine rotor blade generally has the same advantages as the flap arrangement. The wind turbine rotor blade may comprise a suction side and a pressure side. The support portion and/or the flap portion may be connected to the suction side and/or to the pressure side of the blade. Moreover, a number of flap arrangements can be mounted next to one another along the trailing edge of the blade, for example as flap arrangement segments. This has the advantage, that the flap arrangement segments can be easily mounted and demounted to or from a blade.

In a further variant the support portion can be an integral part of the blade. For example, the support portion can be casted into the blade, for example during manufacturing the blade. In this case the wind turbine rotor blade comprises a pressure side and a flap portion as previously described which is connected to the pressure side of the blade. The portion between the connection of the flap portion at the pressure side and the trailing edge of the blade provides a limit to the movement of the flap portion. In other words, the portion of the blade close to the trailing edge acts as support portion, as described in the context of the flap arrangement.

The wind turbine comprises a wind turbine rotor blade as previously described. The wind turbine has the same advantages as the previously described wind turbine rotor blade and the previously described flap arrangement. Generally, the wind turbine can comprise a system for variable speed pitch control. The wind turbine may comprise a pitch system for adjusting the pitch angle of the blades.

The method for enhancing the aerodynamic performance of a wind turbine rotor blade comprising a trailing edge is characterized in connecting a flap arrangement as previously described to the trailing edge of the blade. By connecting a previously described flap arrangement to the wind turbine rotor blade an increased power, for example at low wind speeds, can be obtained from a wind turbine. This increases the effectiveness of the wind turbine.

Moreover, the pitch angle of the blades can be adjusted, for example by means of a variable speed pitch control system.

Generally, a lower cut in wind speed and more power obtained from a wind turbine can be achieved, as well as higher performance at low and medium wind speeds. At the same time no additional mechanical loading of the blades is generated. Provided is a very simply passive solution, whereby no maintenance is needed. Furthermore, the flap arrangement is possible to retrofit and a replacement is easily realizable. A serrated trailing edge shape of the flap arrangement reduces the sound emitted from a wind turbine.

BRIEF DESCRIPTION OF THE DRAWINGS

Further features and properties will become clear from the following description of embodiments in conjunction with the accompanying drawings. The embodiments are not to be limiting as to the scope but to be illustrative. All described features are advantageous as separate features or in any combination with each other.

FIG. 6 schematically shows a flap arrangement explicitly showing the upper side of the support portion.

FIG. 7 schematically shows a sectional view of a wind turbine rotor blade at low wind speed.

FIG. 8 schematically shows a wind turbine rotor blade at high wind speed.

FIG. 10 shows four variants for flap arrangements connected to the trailing edge of a blade in a sectional view.

DETAILED DESCRIPTION

Figure 1:
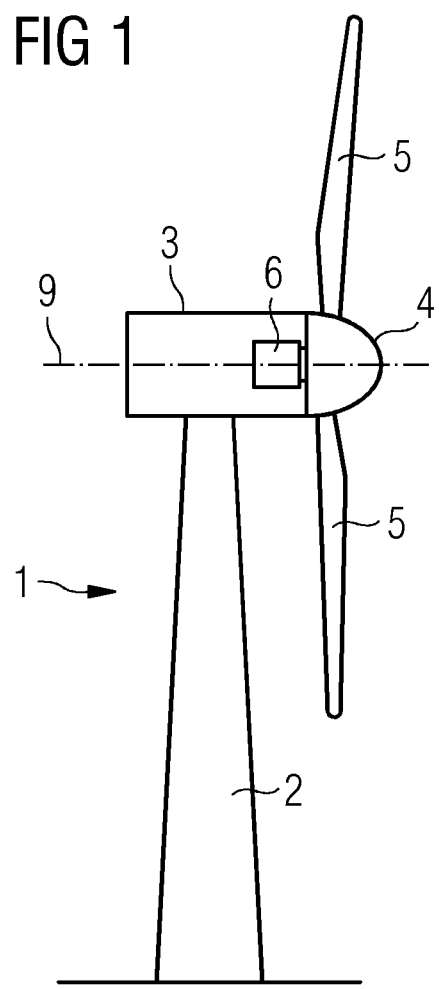
FIG. 1 schematically shows a wind turbine.

FIG. 1 schematically shows a wind turbine 1. The wind turbine 1 comprises a tower 2, a nacelle 3 and a hub 4. The nacelle 3 is located on top of the tower 2. The hub 4 comprises a number of wind turbine blades 5. The hub 4 is mounted to the nacelle 3. Moreover, the hub 4 is pivot-mounted such that it is able to rotate about a rotation axis 9. A generator 6 is located inside the nacelle 3. The wind turbine 1 is a direct drive wind turbine.

Figure 2:
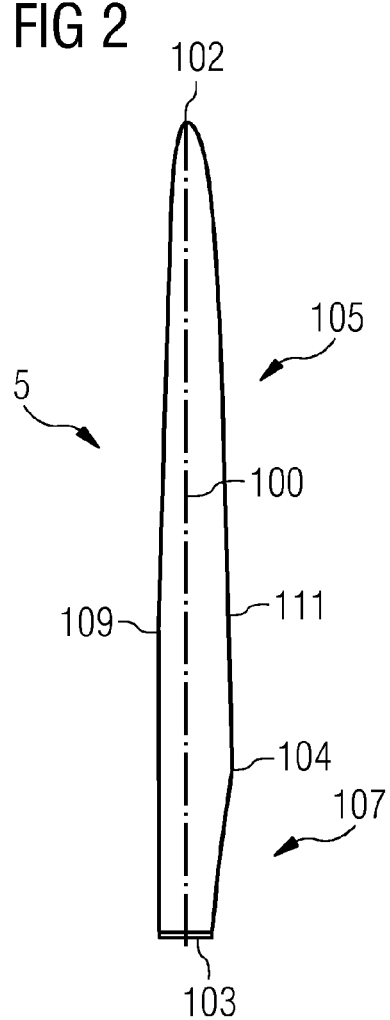
FIG. 2 shows a rotor blade in a plan view on the plane defined by the blade's span and the blade's chord.

FIG. 2 shows a rotor blade in a plan view on the plane defined by the blade's span and the blade's chord. FIG. 2 shows a wind turbine blade 5 as it is usually used in a three-blade rotor. However, the present disclosure shall not be limited to blades for three-blade rotors. In fact, it may as well be implemented in other rotors, e.g. one-blade rotors or two-blade rotors.

The rotor blade 5 shown in FIG. 2 comprises a root portion 103 with a cylindrical profile and a tip 102. The tip forms the outermost part of the blade. The cylindrical profile of the root portion 103 serves to fix the blade to a bearing of a rotor hub. The rotor blade 5 further comprises a so-called shoulder 104 which is defined as the location of its maximum profile depth, i.e. the maximum chord length of the blade. Between the shoulder 104 and the tip 102 an airfoil portion 105 extends which has an aerodynamically shaped profile. Between the shoulder 104 and the cylindrical root portion 103, a transition portion 107 extends in which a transition takes place from the aerodynamic profile of the airfoil portion 105 to the cylindrical profile of the root portion 103. The span line is indicated by reference numeral 100.

Figure 3:
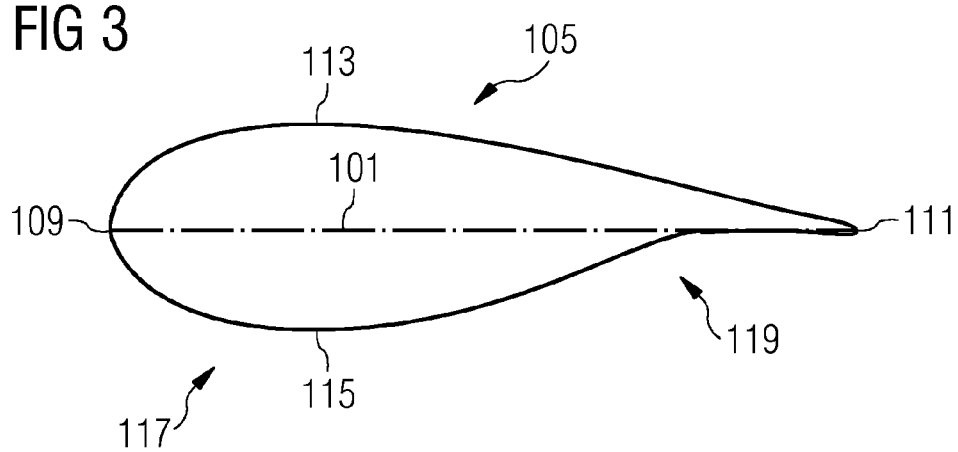
FIG. 3 shows a chord wise section through the airfoil portion of the blade shown in FIG. 2.

A chord-wise cross section through the rotor blade's airfoil section 105 is shown in FIG. 3. Their aerodynamic profile shown in FIG. 3 comprises a convex suction side 113 and a less convex pressure side 115. The dash-dotted line extending from the blade's leading edge 109 to its trailing edge 111 shows the chord line of the profile. Although the pressure side 115 comprises a convex section 117 and a concave section 119 in FIG. 3, it may also be implemented without a concave section at all as long as the suction side 113 is more convex than the pressure side 115. The chord line is indicated by reference numeral 101.

The suction side 113 and the pressure side 115 in the airfoil portion 105 will also be referred to as the suction side and the pressure side of the rotor blade 5, respectively, although, strictly spoken, the cylindrical portion 103 of the blade 5 does not show a pressure or a suction side.

Figure 4:
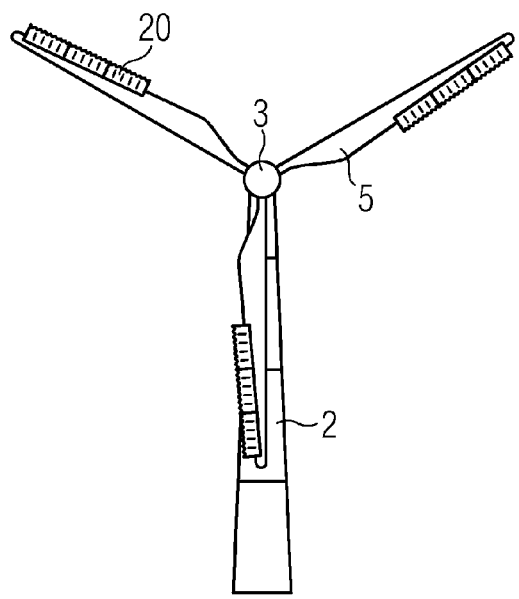
FIG. 4 schematically shows a wind turbine.

FIG. 4 schematically shows a wind turbine, where the rotor blades 5 are equipped with flap arrangements 20. The wind turbine is seen in FIG. 4 from a down wind side.

Figure 5:
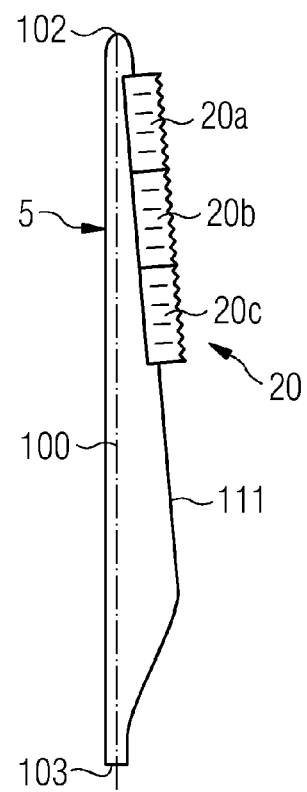
FIG. 5 schematically shows one of rotor blades 5.

FIG. 5 schematically shows one of the rotor blades 5. The flap arrangements 20 are connected to the trailing edges 111 of the blades 5 in FIGS. 4 and 5 close to the tip 102. The flap arrangements 20 are located along the trailing edge 111 at a position in span direction 100 between the blade tip 102 and 50%, in a further embodiment 33%, of the length of the blade in span direction 100 towards the blade root 103. In FIG. 5 the flap arrangement 20 comprises three segments, a radially outer flap arrangement segment 20a, a middle flap arrangement segment 20b and a radially inner flap arrangement segment 20c. The segments 20a, 20b and 20c are located next to each other along the trailing edge 111 of the blade 5.

FIG. 6 schematically shows a flap arrangement explicitly showing the upper side of the support portion 21. The support portion 21 comprises a serrated trailing edge 23. The portion 26 protrudes over the trailing edge 111 of the rotor blade. A surface 24, which does not protrude over the trailing edge 111 of the blade 5, is used for connecting the support portion 21 to the suction side 113 of a blade 5, for example by means of an adhesive. To increase the stiffness and stability of the support portion 21, a number of ribs 25 are located between the portion 26, which protrudes over the trailing edge 111, and the portion 24 which is directly connected to the blade 5.

FIG. 7 schematically shows a sectional view of a wind turbine rotor blade at low wind speed. FIG. 8 schematically shows a wind turbine rotor blade at high wind speed. An arrow 27 indicates the direction of the relative wind, which is the direction of the inflowing air. In FIG. 7 the angle of attack $\alpha_1$, which is the angle between the chord line 101 and the relative wind direction 27 (direction of inflowing air), is relatively large. In FIG. 8 the angle of attack $\alpha_2$ is relatively small.

In FIGS. 7 and 8 the wind turbine rotor blade 5 comprises a flap arrangement located at the trailing edge 111. The flap arrangement comprises a support portion 21, which may be connected to the suction side 113 of the blade, and a flap portion 22, which may be connected to the pressure side 115 of the blade.

The support portion 21 comprises a suction side surface 51 and a pressure side surface 52. The flap portion 22 also comprises a suction side surface 41 and a pressure side surface 42. The suction side surface 51 of the support portion 21 prolongs the suction side 113 of the blade. The pressure side surface 42 of the flap portion prolongs the pressure side 115 of the blade. The pressure side surface 52 of the support portion 21 and the suction side surface 41 of the flap portion 22 are facing towards each other or are located opposite to each other.

At low wind speed and a large angle of attack $\alpha_1$, as shown in FIG. 7, the support portion 21 and the flap portion 22 are in direct contact with each other. The support portion 21 provides a limit for the movement of the flap portion 22. In this situation the flap arrangement provides an extension of effective airfoil which increases the lift of the blade.

At high wind speed and a small angle of attack $\alpha_2$, as shown in FIG. 8, the flap portion 22 moves away from the support portion 21 and a gap occurs between the pressure side surface 52 of the support portion 21 and the suction side surface 41 of the flap portion 22. In this situation the flap arrangement is ineffective and it consequently reduces loads acting on the blade.

The surface normal of part of the suction side surface 41 of the flap portion 22 is indicated by an arrow 34. The angle $\beta_1$ between surface normal 34 and the chord line 101 in FIG. 7 differs form the angle $\beta_2$ between surface normal 34 and the chord line 101 in FIG. 8 and describes the movement of the flap portion 22. Generally, the support portion 21 is stiff and not moveable with respect to the chord line 101. The flap portion 22 is at least partly moveable with respect to the chord line 101, as for example shown in FIGS. 7 and 8.

Figure 9:
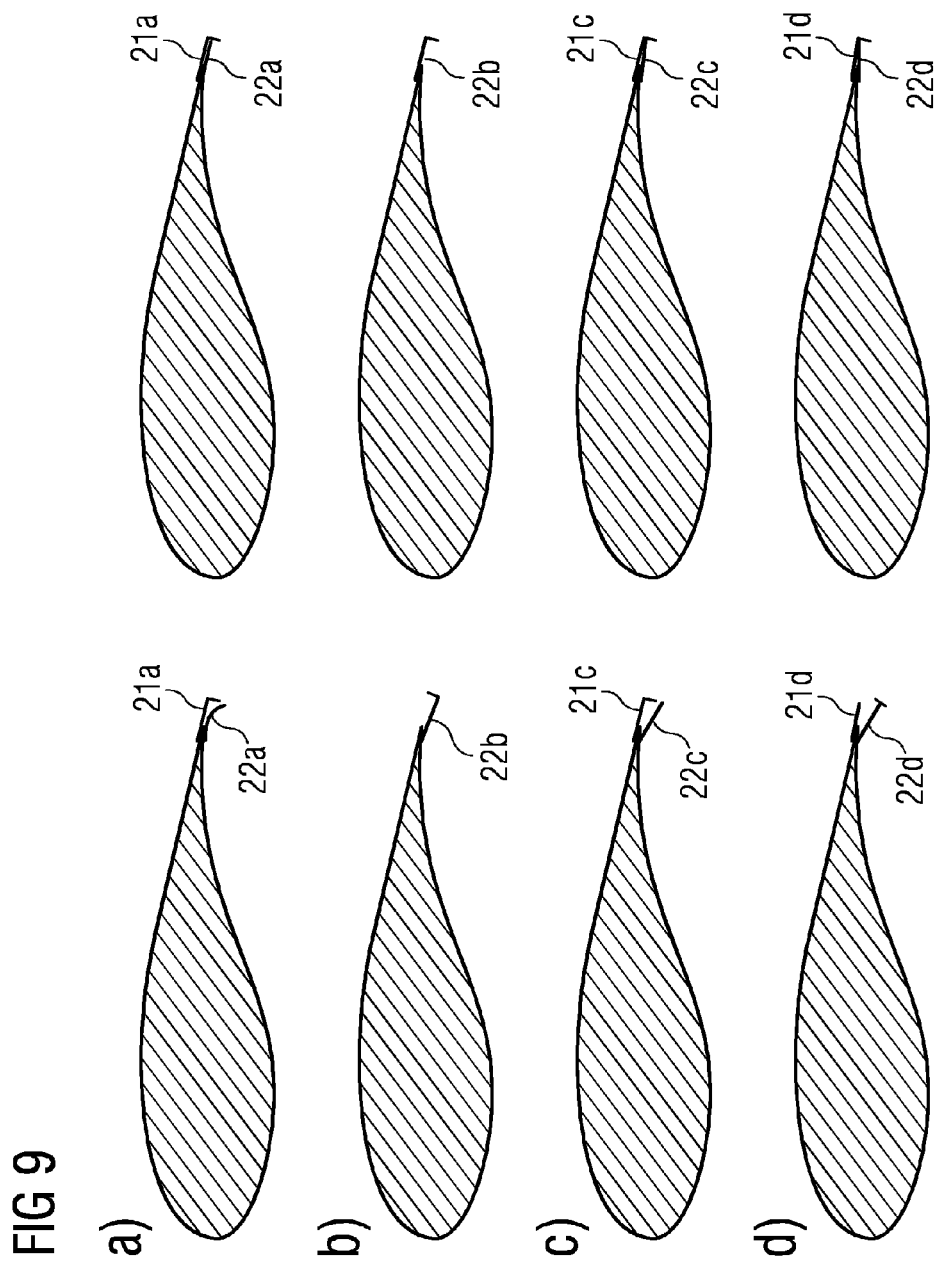
FIG. 9 schematically shows four variants of wind turbine rotor blades in sectional views.

FIG. 9 schematically shows four variants of wind turbine rotor blades in sectional views. The left side of the Figures shows the respective flap arrangement in a position acting as ineffective airfoil and on the right side acting as effective airfoil.

In FIG. 9(a) a one piece suction support structure 21a with a flexible flap portion 22a is shown. In FIG. 9(b) a hinged or tiltable stiff flap 22b is mounted to the pressure side 115 of the blade, where the blade acts as support structure. In FIG. 9(c) a suction side 113 mounted support structure 21c and a hinged or tiltable stiff flap 22c mounted to the pressure side 115 of the blade is shown. In FIG. 9(d) a suction side 113 mounted support structure 21d and a flexible flap 22d mounted to the pressure side of the blade is shown.

FIG. 10 shows four variants for flap arrangements connected to the trailing edge of a blade in a sectional view. In all variants shown in FIG. 10 the movement of the flap portion 32 is indicated by arrows 28. In all four variants shown in FIG. 10 three different positions of the flap portion 32 with respect to the support portion 31 are shown, wherein the left picture shows the situation at a high wind speed and a small angle of attack and the right picture shows the situation at low wind speed and a large angle of attack.

In FIG. 10(a) the support portion 31a is connected to the suction side 113 of the blade. The support portion 31a has a bend shape. It protrudes over the trailing edge 111 of the blade. The flap portion 32a is connected to the pressure side 115 of the blade and comprises flexible material.

In the variant shown in FIG. 10(b) the support portion 31b is connected to the suction side 113 of the blade and the flap portion 32b is connected to the pressure side 115 of the blade. In this variant the flap portion comprises stiff material and a hinge 33, which may be located at the trailing edge 111 of the blade. The hinge 33 provides for a movability of the flap portion 32b with respect to the support portion 31b.

In FIG. 10(c) the support portion 31c and the flap portion 32c are both connected to the suction side 113 of the blade. The support portion 31c consists of stiff material and the flap portion 32c consists of flexible material.

In FIG. 10(d) the trailing edge portion of the blade acts as support portion 31d. The flap portion 32d is connected to the pressure side 115 of the blade and has the same features and properties as the flap portion 32b in FIG. 10(b). The difference between the flap portion 32b and the flap portion 32d is that in FIG. 10(d) the flap portion 32d is connected to the pressure side 115 of the blade such that the hinge 33 is not directly located at the trailing edge 111 of the blade. Instead, the hinge 33 is located at a position at the pressure side 115 of the blade.

Figure 11:
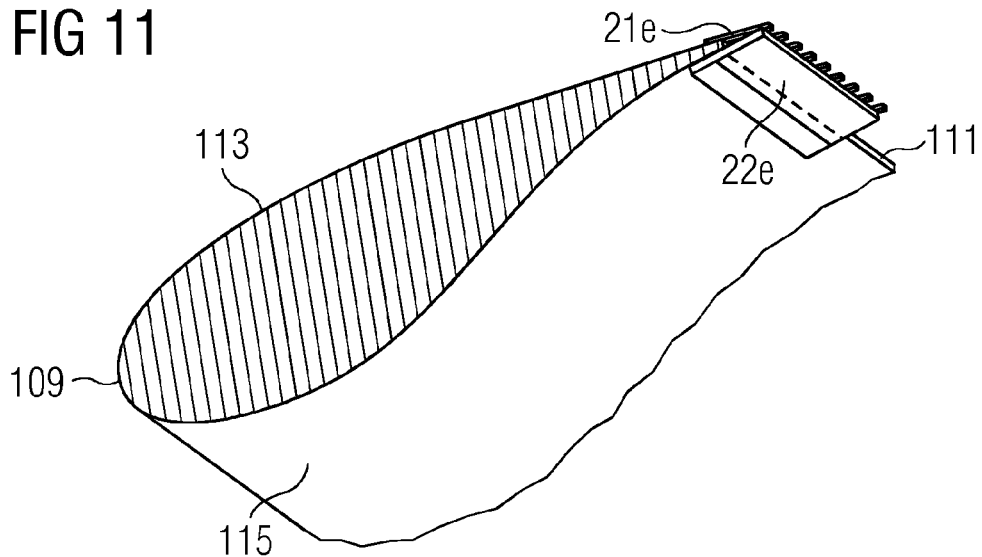
FIG. 11 schematically show a further variant of part of a wind turbine rotor blade in a sectional and perspective view at low wind speed.
Figure 12:
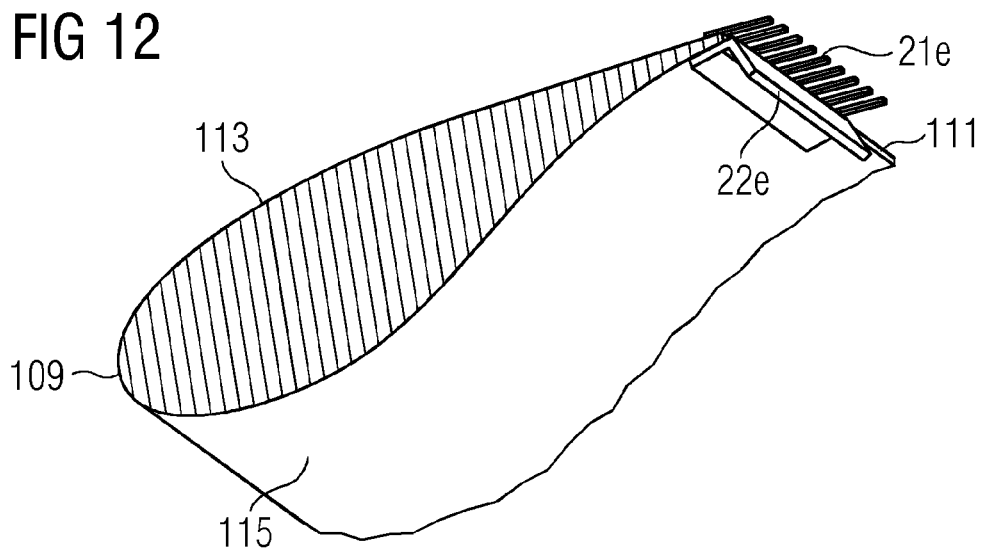
FIG. 12 schematically show a further variant of part of a wind turbine rotor blade in a sectional and perspective view at high wind speed.

FIGS. 11 and 12 schematically show a further variant of part of a wind turbine rotor blade in a sectional and perspective view. FIG. 11 shows the situation at low wind speed, where the flap portion and the support portion are in contact with each other. FIG. 12 shows the situation at high wind speed, where the flap portion 22e has moved away from the support portion 21e. In the variant shown in FIGS. 11 and 12 the support portion 21e has the shape of a basset.

Figure 13:
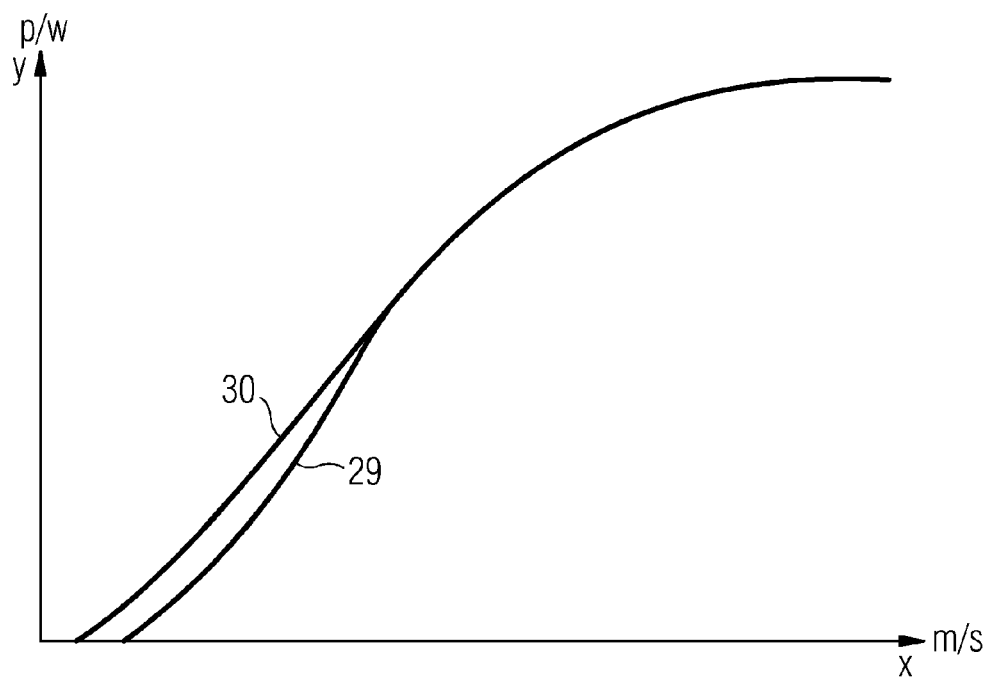
FIG. 13 schematically shows the power curves of a wind turbine in comparison with a conventional wind turbine.

FIG. 13 schematically shows the power curves of a wind turbine in comparison with a conventional wind turbine. The x-axis shows the wind speed in m/s. The y-axis shows the power obtained from the wind turbine in W. The power curve 29 of a wind turbine with a conventional blade is compared with a power curve 30 for a wind turbine with a flap arrangement. The power curve 30 of the wind turbine shows a lower cut in wind speed and generally more power at low wind speeds in comparison to the power curve 29 of the conventional wind turbine blade. This means, that the wind turbine can operate at lower wind speed than conventional wind turbines and produces more power at low wind speeds than conventional wind turbines.

The invention claimed is:

1. A flap arrangement for a wind turbine rotor blade, comprising a leading edge, a trailing edge and a chord line between the leading edge and the trailing edge, the flap arrangement comprising:
   a support portion adapted to prolong a suction side of the wind turbine rotor blade; and
   a flap portion adapted to prolong a pressure side of the wind turbine rotor blade and passively moveable with respect to an angle between a surface normal of a surface of the flap portion and the chord line,
   wherein the support portion and the flap portion are positioned relative to each other such that the support portion provides a limit to the movement of the flap portion.

2. The flap arrangement as claimed in claim 1, wherein the support portion comprises a pressure side surface and a suction side surface, and the suction side surface of the support portion prolongs the suction side of the wind turbine rotor blade, and wherein the flap portion comprises a suction side surface and a pressure side surface, and the pressure side surface of the flap portion prolongs the pressure side of the wind turbine rotor blade.

3. The flap arrangement as claimed in claim 2, wherein the suction side surface of the flap portion and the pressure side surface of the support portion faces towards each other.

4. The flap arrangement as claimed in claim 1, the support portion and/or the flap portion is connectable to a wind turbine rotor blade at the trailing edge of the blade or at a portion of the blade close to the trailing edge, and/or at a position between the tip of the blade and one half of the span length of the blade measured from the tip.

5. The flap arrangement as claimed in claim 1, the flap portion comprises a flexible or hinged flap connection for connecting the flap portion to a wind turbine rotor blade.

6. The flap arrangement as claimed in claim 1, wherein the flap portion comprises a flexible sheet.

7. The flap arrangement as claimed in claim 1, the flap portion and/or the support portion comprises a serrated trailing edge.

8. The flap arrangement as claimed in claim 1, the flap portion and the support portion are made as one piece or several pieces.

9. The flap arrangement as claimed in any claim 1, the support portion comprises a vortex generator.

10. The flap arrangement as claimed in claim 1 the support portion has a bend shape.

11. A wind turbine rotor blade comprising a flap arrangement as claimed in claim 1.

12. The wind turbine rotor blade as claimed in claim 11 wherein the support portion comprises a vortex generator.

13. The wind turbine rotor blade as claimed in claim 11, a plurality of flap arrangements are mounted next to one another along the trailing edge of the blade.

14. The wind turbine rotor blade as claimed in claim 11, support portion is an integral part of the blade.

15. A wind turbine comprising a wind turbine rotor blade as claimed in claim 11.

16. A method for enhancing the aerodynamic performance of a wind turbine rotor blade comprising a trailing edge, comprising:
    connecting a flap arrangement as claimed in claim 1 along the trailing edge of the blade.

17. A flap arrangement for a wind turbine rotor blade, comprising a leading edge, a trailing edge and a chord line between the leading edge and the trailing edge, the flap arrangement comprising:
    a support portion adapted to prolong a suction side of the blade; and
    a flap portion adapted to prolong a pressures side of the blade and passively moveable with respect to the support portion and with respect to an angle between a surface normal of a surface of the flap portion and the chord line,
    wherein the support portion and the flap portion are positioned relative to each other such that the support portion provides a limit to the movement of the flap portion, and wherein in a first state the flap portion is in contact with the support portion and in a second state a gap occurs between the flap portion.

18. The flap arrangement as claimed in claim 17,
    wherein the support portion comprises a pressure side surface and a suction side surface, and the suction side surface of the support portion prolongs the suction side of the wind turbine rotor blade, and wherein the flap portion comprises a suction side surface and a pressure side surface, and the pressure side surface of the flap portion prolongs a pressure side of a wind turbine rotor blade.

19. The flap arrangement as claimed in claim 18,
    wherein the gap in the second state occurs between the pressure side surface of the support portion and the suction side surface of the flap portion.

20. A wind turbine rotor blade comprising a flap arrangement as claimed in claim 19.

* * * * *